United States Patent [19]
Hassan et al.

[11] Patent Number: 5,813,625
[45] Date of Patent: Sep. 29, 1998

[54] ACTIVE BLOWING SYSTEM FOR ROTORCRAFT VORTEX INTERACTION NOISE REDUCTION

[75] Inventors: Ahmed A. Hassan; Friedrich K. Straub, both of Mesa; David B. Domzalski, Gilbert; Dennis K. Kennedy, Mesa, all of Ariz.

[73] Assignee: McDonnell Douglas Helicopter Company, Mesa, Ariz.

[21] Appl. No.: 727,980

[22] Filed: Oct. 9, 1996

[51] Int. Cl.⁶ ................................................. B64C 27/00
[52] U.S. Cl. ..................... 244/17.11; 244/207; 416/90 A; 416/92; 415/119
[58] Field of Search ............................. 244/17.11, 17.13, 244/205, 207, 208, 209, 130; 416/90 A, 92, 20 R; 415/119

[56] References Cited

U.S. PATENT DOCUMENTS

| | | |
|---|---|---|
| 2,071,012 | 2/1937 | Adams . |
| 2,376,834 | 5/1945 | Thompson .............................. 244/207 |
| 2,397,132 | 3/1946 | Dent, Jr. . |
| 2,638,990 | 5/1953 | Pitcairn ................................... 244/207 |
| 2,892,502 | 6/1959 | Donovan . |
| 3,262,658 | 7/1966 | Reilly ...................................... 244/207 |
| 3,451,644 | 6/1969 | Marchetti et al. . |
| 3,509,971 | 5/1970 | Gerstine et al. . |
| 3,588,273 | 6/1971 | Kizilos ................................... 416/90 A |
| 3,612,444 | 10/1971 | Girard ..................................... 244/207 |
| 3,713,750 | 1/1973 | Williams ............................... 416/90 A |
| 3,820,628 | 6/1974 | Hanson ................................... 244/208 |
| 3,954,229 | 5/1976 | Wilson . |
| 4,169,567 | 10/1979 | Tamura ................................... 244/207 |
| 4,514,143 | 4/1985 | Campbell . |
| 4,534,702 | 8/1985 | Johnson, Jr. et al. ................ 416/90 A |
| 4,580,210 | 4/1986 | Nordstrom . |
| 4,706,902 | 11/1987 | Destuynder et al.j . |
| 4,799,859 | 1/1989 | Zimmer ................................ 416/90 A |
| 5,320,491 | 6/1994 | Coleman et al. . |
| 5,437,419 | 8/1995 | Schmitz .................................. 244/199 |
| 5,562,414 | 10/1996 | Azuma ................................... 244/199 |

Primary Examiner—Galen L. Barefoot
Attorney, Agent, or Firm—Donald E. Stout; Kenton R. Mullins

[57] ABSTRACT

A pressurized porous surface near the leading edge of a rotorcraft blade, is designed to be used as an active control device which alleviates the aerodynamics of blade vortex interactions (BVI) and thus the impulsive BVI noise levels and signature. The pressurized porous surface can be actuated on an azimuth-dependent deployment schedule or actuated continuously. The pressurized porous surface is supplied with either positively pressurized air, negatively pressurized air, or a combination of both, when actuated. The pressurized porous surface targets the local blade aerodynamics, rather than the vortex strength or blade/vortex separation distance. This targeting can be achieved through use of negatively pressurized air (suction) blowing in a direction normal to the blade surface to reduce the rotor blade's effective thickness resulting in a smaller leading edge radius as perceived by the vortex wake, and positively pressurized air (blowing) to increase the effective thickness resulting in an increase in the leading edge radius of the blade.

20 Claims, 3 Drawing Sheets

— AZIMUTH-DEPENDENT SUCTION
— AZIMUTH-DEPENDENT BLOWING
— FLIGHT MODE-DEPENDENT SUCTION

ACTIVE BLOWING SYSTEM FOR ROTORCRAFT VORTEX INTERACTION NOISE REDUCTION

BACKGROUND OF THE INVENTION

This invention relates to rotor blades for rotorcraft such as helicopters and the like, and more particularly to an improved construction and control scheme for such rotor blades which permits a significant reduction in noise generated by the blades.

Conventional helicopters in descent flight conditions frequently generate an impulsive noise signature which is commonly referred to as blade-vortex interactions (BVI) noise or "blade slap". BVI noise is generated by blade tip vortices, which interact with the rotor blades. Unfortunately, it is typically within a frequency range which is highly important to human subjective response. Additionally, it is easily detected electronically at large distances, thus increasing the vulnerability of military rotorcraft. Consequently, a reduction in the BVI noise intensity and changes in the noise signature, using active and/or passive noise control techniques, is desirable to the rotorcraft industry, which is challenged by today's stringent military and civilian acoustic regulations.

There are two possible measures which may be taken to reduce BVI noise. Namely, the tip vortex strength may be weakened, and/or the separation distance between the blade and the tip vortex may be increased. The result of both measures is a decrease in the strength of the interaction between the rotor blade and the tip vortices. Existing devices which have been used for reducing BVI noise include Higher Harmonic blade pitch control (HHC), which seeks to change the blade tip vortex strength, and thus the local aerodynamic conditions, through blade pitch changes. Other control means concentrate primarily on reducing the strength of the tip vortex through blade tip geometric modifications. Typical examples are the use of leading and trailing edge sweep, the use of blade anhedral, spoilers, and the use of a subwing concept. All of these examples, excluding HHC, may be classified as passive control techniques. An example of another active control technique would be the use of tip air mass injection, which again has the purpose of weakening the blade tip vortices. Tip air mass injection involves introducing a high energy air jet at the tip of the blade, aimed at the center or core of the tip vortex with the sole purpose of diffusing or weakening its strength.

Each of the prior art solutions to BVI noise has been at least partially unsuccessful, either because of ineffectiveness or because of the solution's detrimental side effects with respect to the flight characteristics and efficiency of the rotorcraft. For example, HHC methods change the aerodynamic conditions along the entire blade in order to reduce BVI noise, due to the change in blade pitch. Passive BVI noise control methods are not adaptable to changing BVI conditions throughout the flight regime, which are associated with changes in descent rate and forward flight speed. Additionally, most of the passive prior art solutions to the BVI problem are deployed at all times, whether or not needed, often degrading flight performance unnecessarily.

SUMMARY OF THE INVENTION

This invention solves the aforementioned problems by providing a BVI noise reduction device which has a number of advantages over prior art solutions. The invention, a pressurized porous surface near the blade tip, is designed to be used as an active control device which alleviates the aerodynamics of the interactions and thus the impulsive BVI noise levels and signature. The pressurized porous surface can be actuated on an azimuth-dependent deployment schedule or actuated continuously.

The pressurized porous surface of the present invention is supplied with either positively pressurized air, negatively pressurized air, or a combination of both, when actuated. The pressurized porous surface targets the local blade aerodynamics, rather than the vortex strength or blade/vortex separation distance. This targeting can be achieved through use of negatively pressurized air (suction) to reduce the rotor blade's effective thickness resulting in a smaller leading edge radius as perceived by the vortex wake, and positively pressurized air (blowing) to increase the effective thickness resulting in an increase in the leading edge radius of the blade. Either positively pressurized air, negatively pressurized air, or a combination of the two, can be implemented by the present invention to increase and decrease the effective thickness of the upper and lower surfaces of the rotor blade during the blade/vortex encounters.

The invention provides an active control device for reducing BVI noise levels generated by a rotorcraft, such as a helicopter, having a rotor blade including a tip end, a root end, a leading edge, and a trailing edge. The rotor blade is attached at the root end to a rotor hub on the rotorcraft and extends radially outwardly therefrom, having a radius and a chord, such that when the rotor hub is rotatably driven, the rotor blade rotates about the hub through a 360 degree azimuth, where 0 degrees azimuth is located at the downstream side of the disk, normally over the tailboom. The active control device includes a fluid source adapted for providing pressurized fluid to an interior area of the rotor blade, and further includes at least one aperture disposed along a substantial surface area of the rotor blade near both the leading edge and the tip end of the rotor blade. The aperture is adapted for directing the pressurized fluid, such as air, out of the interior of the rotor blade and generally normal to the blade surface. The active control device further includes a regulator adapted for activating the fluid source to provide pressurized fluid to the interior of the rotor blade. The regulator may be adapted for activating the fluid source, depending on the azimuth of the rotor blade.

More particularly, the rotor azimuth has first, second, third, and fourth quadrants, the first quadrant comprising 0 to 90 degrees azimuth, the second quadrant comprising 90 to 180 azimuth, the third quadrant comprising 180 to 270 degrees azimuth, and the fourth quadrant comprising 270 to 360 degrees azimuth. In the preferred embodiment, wherein it is desired to reduce advancing BVI noise (which is noise generated through the first and second quadrants, and is typically louder than retreating BVI noise), the fluid source is activated according to a schedule, such that the fluid source provides pressurized fluid when the rotor blade is advancing through at least a portion of the first and second quadrants. The fluid source can be activated according to the schedule such that pressurized fluid is initiated at approximately a 0 degree azimuth, plus or minus 15 degrees, gradually increased to a peak intensity at approximately a 15 degree azimuth, plus or minus 15degrees, and subsequently kept approximately constant until approximately a 165 degree azimuth, plus or minus 15 degrees. The pressurized fluid is then gradually decreased according to the schedule back to a minimum intensity at an approximately 180 degree azimuth, plus or minus 15 degrees.

The rotor blade includes an upper surface and a lower surface, and the substantial surface area of the rotor blade comprises a portion of both the upper surface and the lower surface. The substantial surface area of the rotor blade is defined near a leading edge vicinity of the rotor blade, and extends onto both the upper surface and the lower surface of the rotor blade. More particularly, the substantial surface area is defined from the leading edge to approximately a 15 to 25 percent chord position, on both the upper surface and the lower surface of the rotor blade. The rotor blade can be defined as having a 0 percent radial station at the root end, and a 100 percent radial station at the tip end of the rotor blade. The substantial surface area is defined from approximately a 55 percent radial station to approximately a 95 percent radial station of the rotor blade. The at least one aperture disposed along the substantial surface area of the rotor blade preferably includes a plurality of apertures disposed along the substantial surface area of the rotor blade. The diameters of the plurality of apertures can vary with distance along the chord dimension of the rotor blade to provide for a streamwise gradient in the apertures, or the diameters can be uniform.

The pressurized fluid supplied by the fluid source can be either a positive pressure, a negative pressure, or a combination of both. More particularly, the fluid source of the present invention is adapted for providing positively pressurized fluid to a first interior section of the rotor blade that is in fluid communication with a first set of the plurality of apertures, and the fluid source is adapted for providing negatively pressurized fluid to a second interior section of the rotor blade that is in fluid communication with a second set of the plurality of apertures. The positively pressurized fluid and the negatively pressurized fluid can be provided at approximately the same time or at different times. According to one aspect of the present invention, a first interior section of the rotor blade is in fluid communication with a portion of the upper side of the rotor blade, and a second interior section of the rotor blade is in fluid communication with a portion of the lower side of the rotor blade.

According to another aspect of the present invention, an active control device includes a rotor blade having an outer surface, a tip end, a root end, a leading edge, and a trailing edge. The rotor blade is adapted to be attached at the root end to a rotor hub of a rotorcraft. The active control device further includes a porous surface disposed on the outer surface of the rotor blade near the leading edge of the rotor blade, and a fluid conduit disposed within the rotor blade. The fluid conduit is adapted for connecting the porous surface to a source of pressurized air.

In yet another aspect of the present invention, a method for reducing BVI noise generated by a rotorcraft having a rotor blade is disclosed, wherein the rotor blade includes a tip end, a root end, a leading edge, and a trailing edge. The rotor blade is attached at the root end to a rotor hub of the rotorcraft and extends radially outwardly therefrom, such that when the rotor hub is rotatably driven, the rotor blade rotates about the hub through a 360 degree azimuth comprised of first, second, third, and fourth quadrants. The first quadrant comprises 0 to 90 degrees azimuth, the second quadrant comprises 90 to 180 degrees azimuth, the third quadrant comprises 180 to 270 degrees azimuth, and the fourth quadrant comprises 270 to 360 degrees azimuth.

The method comprises a step of determining whether at least one predetermined flight condition is to be executed. A subsequent step of directing pressurized fluid through the vent area is performed, upon a determination that the at least one predetermined flight condition is to be executed. The predetermined flight condition to be executed can include a low-speed descent flight condition, lift augmentation during maneuvering flight, retreating blade lift enhancement during high speed forward flight, vibration reduction, rotor blade pitch control, and an aerodynamic blade twist modification.

The present invention, together with additional features and advantages thereof, may best be understood by reference to the following description taken in connection with the accompanying illustrative drawings.

DETAILED DESCRIPTION OF THE PRESENTLY PREFERRED EMBODIMENT

Figure 1:
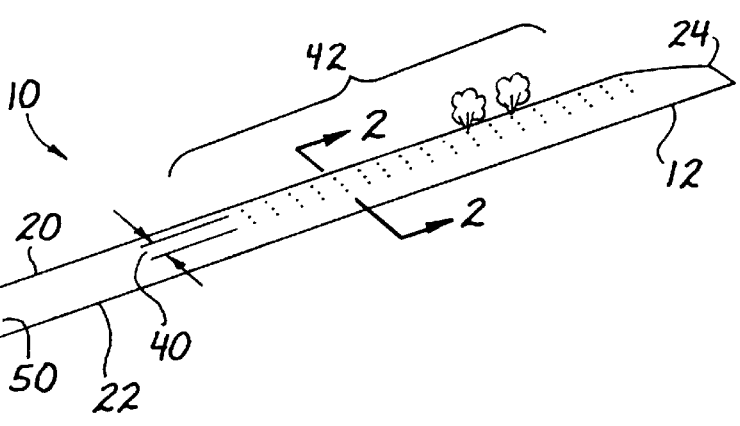
FIG. 1 is a perspective view of a rotor blade for a rotorcraft, configured in accordance with the present invention, having a porous surface disposed thereon for providing active control of BVI noise.

Referring now more particularly to FIG. 1, the blade-vortex interactions (BVI) noise reduction system 10 of the present invention comprises a rotor blade 12, a fluid source 14, and a regulator 16. The rotor blade 12 comprises a leading edge 20, a trailing edge 22, a tip end 24, and a root end 26. The rotor blade 12 is adapted for being attached at its root end 26 to a rotor hub (not shown) in a conventional fashion, so that when the rotor hub is rotationally driven by the rotorcraft engine (or, alternatively, when the rotor hub is permitted to autorotate), the rotor blade 12 will rotate about the rotor hub through a full azimuth of 360 degrees. As presently embodied, the rotor blade 12 further comprises a plurality of apertures 30. Each of the apertures 30 is preferably in fluid communication with the fluid source 14. The apertures 30 comprise a porous surface, and the diameters of the apertures 30 may vary with distance from the leading edge 20. The diameters of the apertures 30, which constitute the porous surface, can be varied with distance from the leading edge 20 to thereby provide for a streamwise gradient of fluid through the apertures 30. In an alternative embodiment of the present invention, the diameters of the apertures 30 are uniform.

The apertures 30 are preferably disposed on the rotor blade 12 near the leading edge 20 and near the tip end 24. As presently embodied, the apertures 30 comprise a porous strip or glove along the leading edge 20, and extend approximately a distance 40 of 15 to 25 percent chord. The porous strip or glove extends along the radius of the rotor blade 12 for approximately 40 percent span 42, which preferably extends between the 55 percent and 95 percent radial stations of the rotor blade 12. The apertures 30, which are in fluid communication with the fluid source 14, can be configured for providing both positive suction and negative suction to the ambient atmosphere. Negatively pressurized fluid can be supplied by means of the fluid source 14 providing negative suction from a vacuum air pump, for example. The apertures 30 can further be used for providing positively-pressurized air injections from the interior of the rotor blade 12 into the ambient atmosphere, by means of the fluid source 14 providing positively pressurized air using an air compressor, for example. The fluid source 14 may comprise both a vacuum air pump and an air compressor, for example. In a simple preferred embodiment, the fluid source 14 only comprises positively pressurized air.

The apertures 30 are preferably actively controlled to thereby target local blade aerodynamics, rather than targeting the vortex strength, or the blade/vortex separation distance, to thereby reduce BVI noise. Suction in a direction generally normal to the blade surface is provided by the apertures 30, according to one embodiment of the present invention, to reduce the effective thickness of the rotor blade 12, resulting in a smaller leading edge radius as perceived by the vortex wake. Blowing in a direction generally normal to the surface of the blade is provided by the apertures 30 to increase the effective thickness of the rotor blade 12, resulting in an increase in the leading edge radius of the rotor blade. According to still another embodiment of the present invention, a combination of suction and blowing is provided by the apertures 30 to increase and decrease the effective thickness of the upper surface 50 and/or the lower surface 52 of the rotor blade 12 during the blade/vortex encounters.

Figure 2:
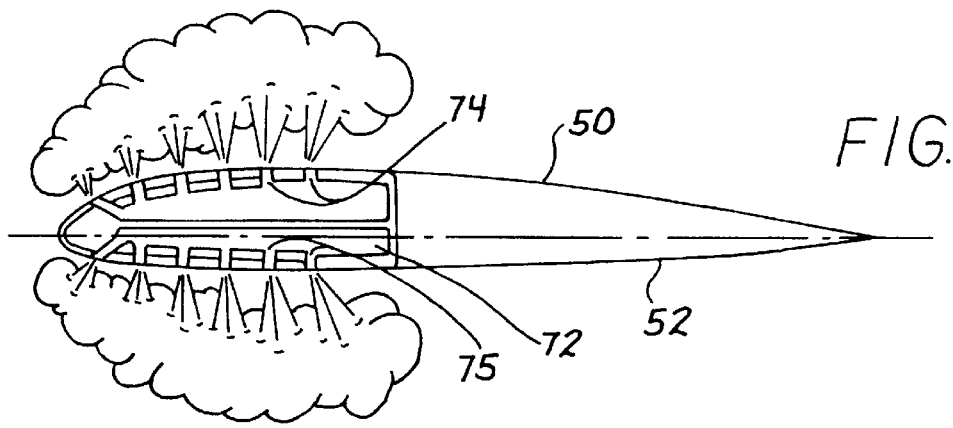
FIG. 2 is a cross-sectional view of the rotor blade of FIG. 1.

FIG. 2 illustrates a cross-sectional view of the rotor blade 12 of FIG. 1, taken along the line 2–2 of FIG. 1. The embodiment of FIG. 2 comprises positively pressurized air in both the first interior section 70 and the second interior section 72. As presently preferred, the first interior section 70 and the second interior section 72 are both connected to the fluid source 14 (FIG. 1) According to this preferred embodiment, both the top apertures 74 and the bottom apertures 75 blow air into ambient atmosphere, when the fluid source 14 is activated. Alternatively, either the first interior section 70 or the second interior section 72 may be supplied with a negatively pressurized fluid source. For example, the first interior section 70 may be positively pressurized for blowing air through the top apertures 74, and the second interior section 72 may be negatively pressurized for drawing air through the bottom apertures 75.

The present inventors have determined that both blowing of air through the upper surface 50 and drawing of air through the lower surface 52, is approximately equivalent to drawing of air through the upper surface 50 and blowing of air through the lower surface 52. Additionally, the present inventors have determined that either of the two above-mentioned combinations is approximately equivalent to blowing of air through both the upper surface 50 and the lower surface 52. Accordingly, the presently preferred embodiment comprises blowing of air through both the top apertures 74 and the bottom apertures 75, and a single fluid source 14 for providing pressurized air to both the first interior section 70 and the second interior section 72. As presently preferred, the fluid source 14 comprises an air compressor in the fuselage of the aircraft for supplying compressed air, and the rotor hub comprises a pneumatic slipring for providing fluid communication between the first interior section 70, the second interior section 72, and the fluid source 14. Alternatively, an air compressor may be provided within the rotor hub. Both the first interior section 70 and the second interior section 72 are preferably disposed within the inside of the rotor blade spar.

According to a first preferred embodiment of the porous BVI noise reduction system 10 of the present invention, the apertures 30 blow pressurized air into an ambient atmosphere according to an azimuth-dependent schedule. A regulator 16, for example, may control the fluid source 14 according to the azimuth-dependent schedule. Alternatively, a flight mode dependent activation of the fluid source 14 may be incorporated where, for example, the fluid source 14 is activated only during low-speed descent flight. The fluid source 14 is activated to supply either positively pressurized air or negatively pressurized air to the first interior section 70 and either positively pressurized air or negatively pressurized air to the second interior section 72, depending on the azimuth of the rotor blade 12. As presently preferred, the fluid source 14 is first activated near the 0 degree azimuth and is gradually increased to a peak intensity at approximately the 15 degree azimuth. This peak intensity is preferably maintained over the advancing side of the rotor disk where the strongest BVI noise is known to occur. At the 165 degree azimuth, the fluid source 14 is gradually reduced, until the 180 degree azimuth. Other schedules may be used, however, without departing from the scope of the present invention.

Figure 3:
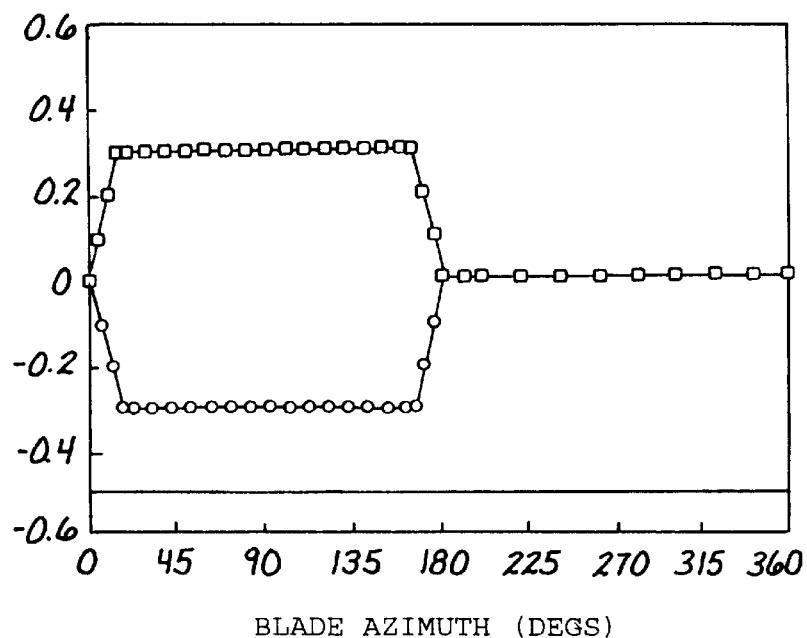
FIG. 3 is a schematic plot illustrating azimuth dependent and flight mode dependent suction and blowing schedules, according to the presently preferred embodiment.

FIG. 3 illustrates a schematic plot of a flight schedule for providing suction, blowing, or both, to a rotor blade, depending upon the azimuth of the rotor blade. Azimuth dependent suction is applied over a 0 to 180 degree azimuth, as is azimuth dependent blowing. Flight mode dependent suction and/or blowing, however, may be implemented according to parameters other than azimuth. The exemplary flight mode-dependent suction solid line is shown having a normalized transpiration velocity of approximately –0.5, but a –0.3 normalized transpiration velocity, for example, may be just as effective. Also, positive values (blowing) of the exemplary –0.5 or –0.3 normalized transpiration velocities (i.e., 0.5 or 0.3) may also be used as an alternative to, or in combination with, the negative values (suction) of the exemplary –0.5 or –0.3 normalized transpiration velocities. According to an alternative embodiment of the present invention, blowing, suction, or both, may be maintained by the fluid source 14 over the entire rotor disc (360 degree azimuth) for a simplified design which impacts both the advancing BVI noise and the retreating BVI noise.

FIGS. 4–9 illustrate results obtained from computational fluid dynamics simulations of air flow past an exemplary rotor during low speed descent flight conditions. The simulated rotor comprised a five-bladed McDonnell Douglas 900 rotor. The simulation was performed with a 6 degree glide slope, which is an expression of the angle that the aircraft is approaching the ground; a Vinf ("V infinity") value of 82.36 knots, which is an expression of the aircraft velocity moving through still or stationary air; a hover tip mach number of 0.6225, which is a measure of the rotor blade tip speed relative to the speed of sound; an advance ratio of 0.20, which is an expression of the rotor blade tip velocity divided by the velocity of the aircraft; and a Ct/s value of 0.0775, which is an expression of the amount of lift generated by the rotor blade (the thrust coefficient, "Ct") divided by sigma ("s") which expresses the solidity of the rotor blade disk. For example, sigma would be greater for a large number of rotor blades and smaller for a small number of rotor blades.

Each of the FIGS. 4–9 illustrates the differential pressures at the 1 percent chord position, as a function of blade azimuth and radial position. For the baseline rotor, for example, the impulsive variations in the differential pressures, corresponding to BVI noise, provide clear evidence of the advancing blade BVI noise. Looking at FIG. 6, for example, the eight impulsive variations occurring at azimuth blade positions between approximately 0 and 120 degrees can clearly be seen.

Figure 4:
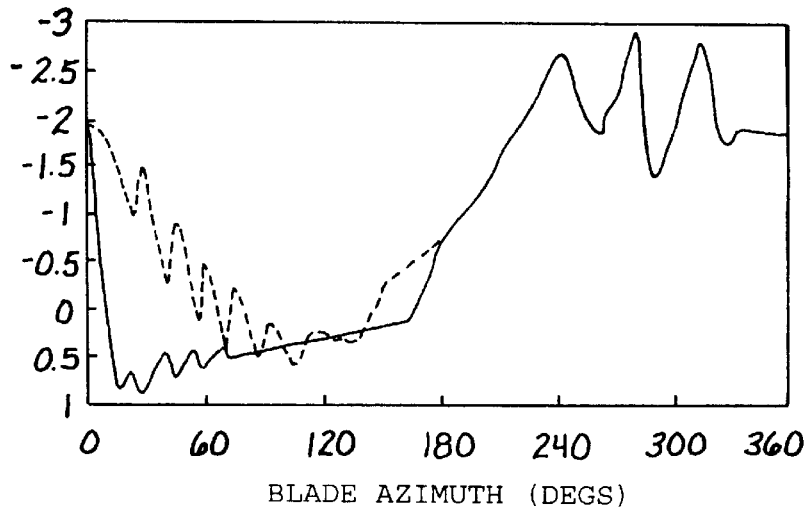
FIGS. 4–9 illustrate results obtained from computational fluid dynamics simulations of air flow past a rotor blade during conditions of low speed descent flight.
Figure 5:
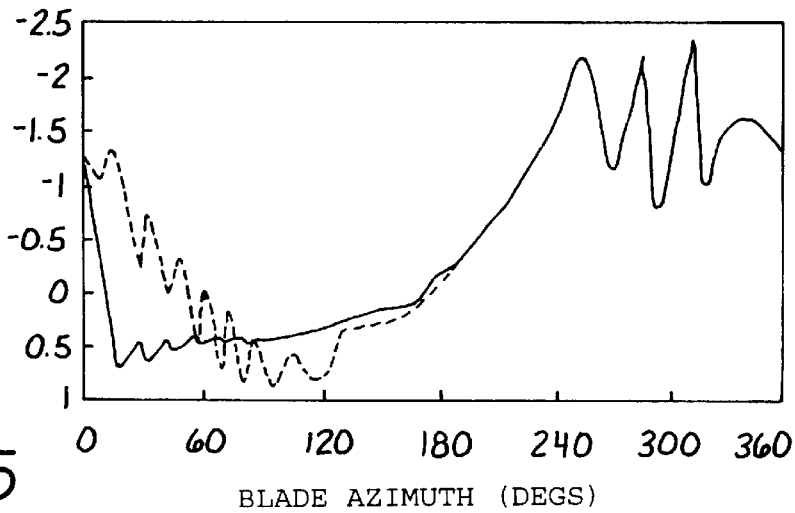
Figure 6:
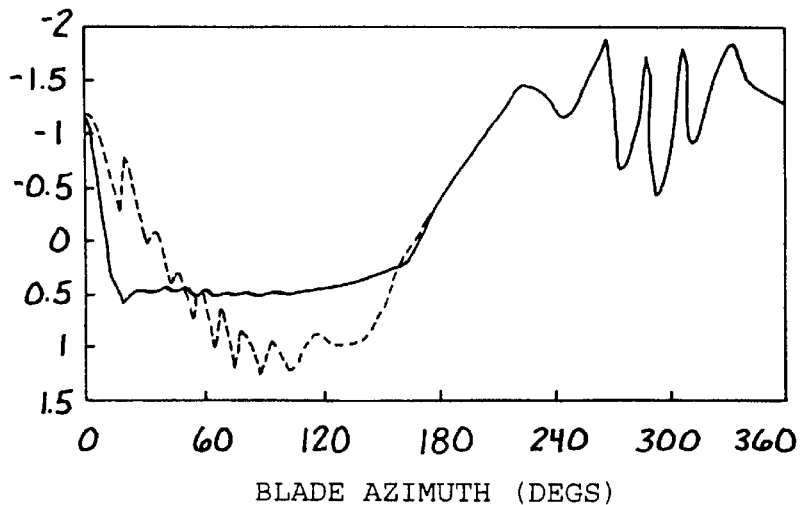
Figure 7:
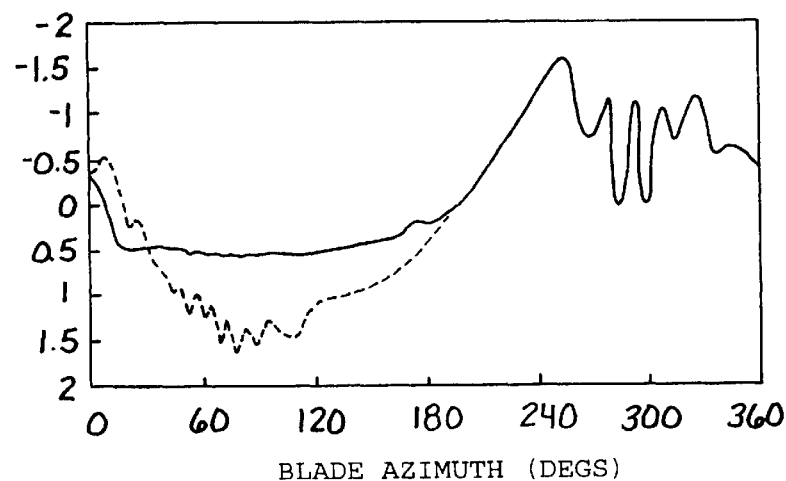
Figure 8:
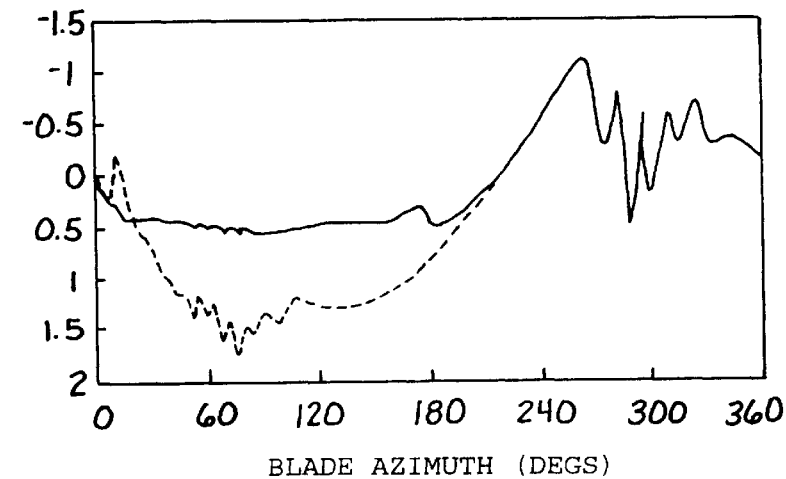
Figure 9:
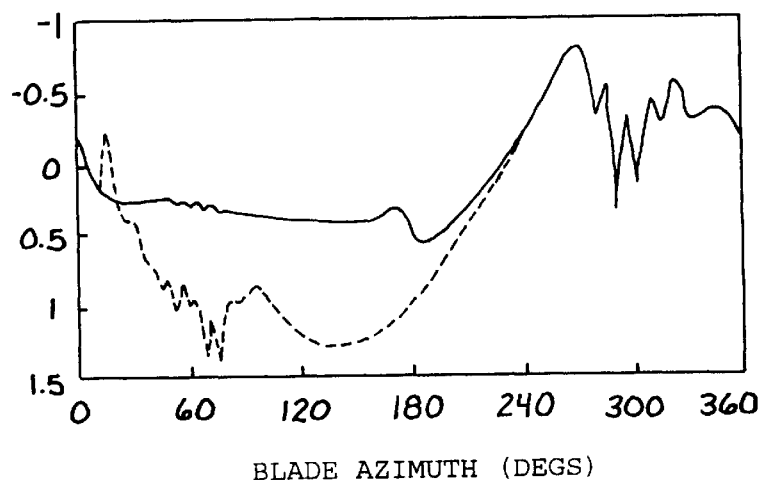

The plot of differential pressure, as corrected by the BVI noise reduction system of the present invention, using a blowing schedule similar to that illustrated in FIG. 3, shows very little evidence of the original advancing BVI noise at the radial stations of 0.6 and 0.7 in FIGS. 4 and 5. Substantially all evidence of the BVI noise at the radial stations of 0.8, 0.9, 0.95, and 0.99, corresponding to FIGS. 6–9, respectively, is eliminated, after being corrected by the BVI noise suppression system of the present invention.

The porous BVI noise reduction system 10 of the present invention provides the means for changing the local aerodynamics of the rotor blade through suction and/or blowing independent of the vortex strength, the blade/vortex separation distances, and the number of blade/vortex encounters. The prior art HHC, for example, where the aerodynamics of the entire blade were changed due to the input clutch control, was unable to change the local aerodynamics of the rotor blade independently of the above-mentioned factors. The suction and blowing rates of the present invention are adaptable to changing BVI noise conditions, which are associated with changes in the descent and forward flight speed, for example. This provides a further advantage over passive BVI noise control methods which do not provide such flexibility. The porous BVI noise reduction system of the present invention may be completely turned off and, subsequently, turned on only during low speed descent flight conditions. The porous BVI noise reduction system of the present invention can further be activated for a variety of other purposes, such as lift augmentation during maneuvering flight, retreating blade lift enhancement during high speed forward flight, vibration reduction, rotor blade pitch control, and/or aerodynamic blade twist modifications. The present invention, in addition to providing BVI noise reduction, provides flexibility through a single device for performing multiple functions and improving the aerodynamics, acoustics, and dynamics of conventional and advanced helicopter rotor blades.

Although exemplary embodiments of the invention have been shown and described, many other changes, modifications and substitutions, in addition to those set forth in the above paragraphs, may be made by one having ordinary skill in the art without necessarily departing from the spirit and scope of this invention.

What is claimed is:

1. An active control device for reducing blade-vortex-interaction (BVI) noise generated by a rotorcraft having a rotor blade including an interior, a tip end, a root end, a leading edge, a trailing edge, an upper surface, a lower surface, a radius, and a chord, the rotor blade being attached at the root end to a rotor hub on the rotorcraft and extending radially outwardly therefrom such that when the rotor hub is rotatably driven the rotor blade rotates about the hub through a 360 degree azimuth, the active control device comprising:

a fluid source adapted for providing pressurized fluid to the interior of the rotor blade; and a plurality of apertures disposed along a substantial surface area of the rotor blade on both the upper surface and the lower surface near both the leading edge and the tip end of the rotor blade, the plurality of apertures being adapted for directing the pressurized fluid out of the interior of the rotor blade and in a direction generally normal to the blade surface.

2. The active control device as recited in claim 1, the pressurized fluid comprising air.

3. The active control device as recited in claim 1, further comprising:

a regulator adapted for activating the fluid source to provide pressurized fluid to the interior of the rotor blade, the regulator being adapted for activating the fluid source, depending on the azimuth of the rotor blade.

4. The active control device as recited in claim 3, the rotor azimuth having first, second, third, and fourth quadrants, the first quadrant comprising 0 to 90 degrees azimuth, the second quadrant comprising 90 to 180 degrees azimuth, the third quadrant comprising 180 to 270 degrees azimuth, and the fourth quadrant comprising 270 to 360 degrees azimuth, the fluid source being activated according to a schedule such that it is activated to provide pressurized fluid when the rotor blade is advancing through at least a portion of the first and second quadrants.

5. The active control device as recited in claim 3, the fluid source being activated according to a schedule such that it is not activated when the rotor blade is in the third and fourth quadrants.

6. The active control device as recited in claim 3, the fluid source being activated according to a schedule such that pressurized fluid is initiated at approximately a 0 degree azimuth, plus or minus 15 degrees, and gradually increased to a peak intensity at approximately a 15 degree azimuth, plus or minus 15 degrees, and kept approximately constant until approximately a 165 degree azimuth, plus or minus 15 degrees, and the pressurized fluid being gradually decreased according to the schedule back to a minimum intensity at an approximately 180 degree azimuth, plus or minus 15 degrees.

7. The active control device as recited in claim 1, further comprising:

a regulator adapted for activating the fluid source to provide pressurized fluid to the interior of the rotor blade, the regulator being adapted for activating the fluid source when the rotorcraft is in a low speed descent flight.

8. The active control device as recited in claim 1, the substantial surface area being defined near a leading edge vicinity of the rotor blade and extending onto both the upper surface and the lower surface of the rotor blade.

9. The active control device as recited in claim 8, the substantial surface area being defined from the leading edge to approximately a 15 to 25 percent chord position, on both the upper surface and the lower surface of the rotor blade.

10. The active control device as recited in claim 8, the rotor blade being defined from a 0 percent radial station at the root end of the rotor blade, to a 100 percent radial station at the tip end of the rotor blade, and the substantial surface area being defined from approximately a 50 to 60 percent radial station, to approximately a 90 to 100 percent radial station.

11. The active control device as recited in claim 10, the substantial surface area being defined from approximately a 55 percent radial station, to approximately a 95 percent radial station.

12. The active control device as recited in claim 8, each of the plurality of apertures comprising a diameter, and the diameters of the apertures varying with distance along the chord dimension of the rotor blade.

13. The active control device as recited in claim 8, the pressurized fluid supplied by the fluid source comprising at least one of a positive pressure and a negative pressure.

14. The active control device as recited in claim 13, the fluid source being adapted for providing positively pressurized fluid to a first interior section of the rotor blade that is in fluid communication with a first set of the plurality of apertures, and the fluid source being adapted for providing negatively pressurized fluid to a second interior section of the rotor blade that is in fluid communication with a second set of the plurality of apertures.

15. The active control device as recited in claim 14, the fluid source being adapted for providing the positively pressurized fluid to the first interior section and for providing the negatively pressurized fluid to the second interior section at approximately the same time.

16. The active control device as recited in claim 15, the first interior section being in fluid communication with a portion of the upper side of the rotor blade, and the second interior section being in fluid communication with a portion of the lower side of the rotor blade.

17. An active control device, comprising:

a rotor blade including a tip end, a root end, an upper surface, a lower surface, a leading edge, and a trailing edge, the rotor blade being adapted to be attached at the root end to a rotor hub on a rotorcraft;

a first plurality of apertures disposed on the upper surface of the rotor blade near the leading edge of the rotor blade;

a second plurality of apertures disposed on the lower surface of the rotor blade near the leading edge of the rotor blade; and a fluid conduit disposed within the rotor blade, the fluid conduit being adapted for connecting both the first plurality of apertures and the second plurality of apertures to a source of pressurized air.

18. The rotor blade as recited in claim 17, wherein:

the first plurality of apertures comprises a porous surface disposed on the upper surface; and the second plurality of apertures comprises a porous surface disposed on the lower surface.

19. A method of reducing blade-vortex-interaction (BVI) noise generated by a rotor blade having an upper surface and a lower surface, the rotor blade further having a leading edge vicinity, an interior volume, and a porous vent area disposed on both the upper surface and the lower surface near the leading edge vicinity, the porous vent area fluidly connecting the interior volume to an ambient atmosphere, the method comprising the following steps:

determining whether at least one predetermined flight condition is to be executed; and directing pressurized fluid in a direction generally normal to the blade surface through the porous vent area, which is disposed on both the upper surface and the lower surface near the leading edge vicinity, upon a determination that the at least one predetermined flight condition is to be executed.

20. The method according to claim 19, the step of determining whether at least one predetermined flight condition is to be executed comprising a step of determining whether one of the following flight conditions is to be executed:

(a) a low-speed descent flight condition;

(b) lift augmentation during maneuvering flight;

(c) retreating blade lift enhancement during high speed forward flight;

(d) vibration reduction;

(e) rotor blade pitch control; and (f) an aerodynamic blade twist modification.

* * * * *